Oct. 4, 1966   A. L. SCHMIDT   3,276,811
VEHICLE AIR DEFLECTOR
Filed May 26, 1964   2 Sheets-Sheet 1

*INVENTOR.*
ARTHUR L. SCHMIDT
BY
*Charles L. Lovercheck*
*Attorney*

Oct. 4, 1966   A. L. SCHMIDT   3,276,811
VEHICLE AIR DEFLECTOR
Filed May 26, 1964   2 Sheets-Sheet 2

INVENTOR.
ARTHUR L. SCHMIDT
BY
Charles L. Lovercheck
Attorney

United States Patent Office 3,276,811
VEHICLE AIR DEFLECTOR
Arthur L. Schmidt, 121 Randall St., Reinbeck, Iowa
Filed May 26, 1964, Ser. No. 370,180
7 Claims. (Cl. 296—1)

This invention relates to improved shields and, more particularly, to a type of shield suitable to use on top of a station wagon or vehicle where it is desirable to keep the airstream from blowing dust into the rear window of the vehicle.

The shield is made generally of a rigid sheet which is supported on the top. At the rear across the width of the top, a curved edge is provided spaced behind the rear of the top. The sheet is made of two halves, one overlapping the other just enough for a few bolts to hold it in position together.

The rear edge of the sheet is curved down so that it overlaps the rear end of the station wagon. Due to different makes of station wagons, the shape of the sheet makes it possible for it to work on various different radii of styles and extend over the rear edge in a satisfactory manner in most of them. The shield is held in place on the top of the station wagon by eight suction cups, four in front and four in back, with downwardly extending tube members to hold them at the right spacing above the top of the station wagon.

While the suction cups on these tubes have certain advanges, there are many other means that could be used to support the shield on the top of a vehicle. With the top in position, the shield will keep the dust from coming into the rear window of the station wagon when it is open.

It is, accordingly, an object of the invention to provide an improved dust shield for a station wagon.

Another object is to provide an improved shield for supporting on top of a vehicle for preventing dust from coming into the rear end thereof.

Another object is to provide an improved shield for a vehicle in combination with a vehicle.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
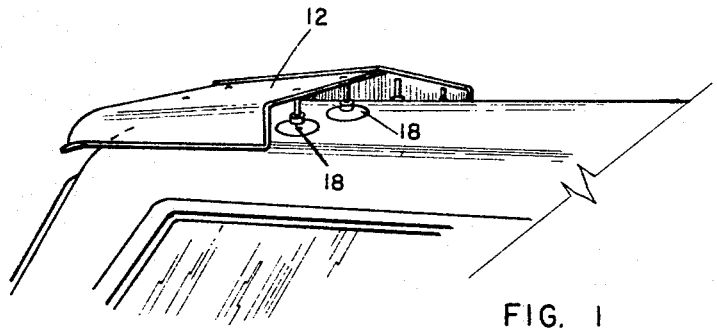
FIG. 1 is an isometric front view of the shield according to the invention.
Figure 2:
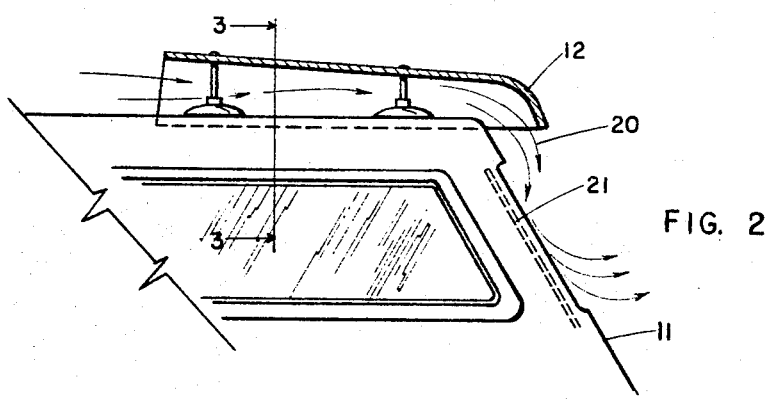
FIG. 2 is a longitudinal cross sectional view of the shield supported on the vehicle.
Figure 3:
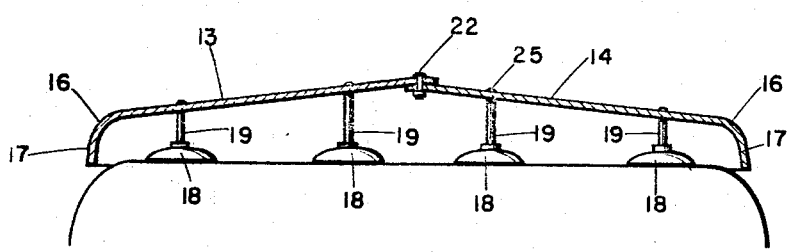
FIG. 3 is a cross sectional view taken on line 3—3 of FIG. 1.

Now with more particular reference to the drawing, the shield 12 is shown supported on top of the auto body 11. The shield is made up of a sheet which has two sections 13 and 14 that overlap slightly at the center and are attached by means of bolts 22. The shield inclines slightly toward the outer edges of the vehicle as shown and is bent down sharply generally at right angles along the side edges 16 to form the downwardly extending side members 17 that are supported in slight spaced relation from the side edges of the station wagon.

The shield is open at the front and has the downwardly extending rear edge end 12 that will be spaced rearward from the end of the vehicle to provide a flow path along the line shown by the arrows 20 which will direct the air downwardly and prevent it from entering the rear window 21 of the vehicle when the window is open.

Tubular spacer members 19 are attached to the sheet by means of nuts 25 and they terminate in a plane slightly above a plane passing through the lower edge of the sides and rear end of the shield when the vacuum cups 18 are in use position. It will be noted that the vacuum cups are supported in two longitudinal rows and four of them in each row. The spacers 19 at the center are longer than those at the sides since the shield sheet is formed to incline slightly upwardly at the center. This causes more air to be scooped at the center and directed over the rear end.

When the shield is in the position shown on the vehicle, the air will enter the front and be driven rearwardly and downwardly over the rear end and this will direct an air blast over the rear end of the vehicle to prevent dust from coming up and entering the rear window.

Figure 4:
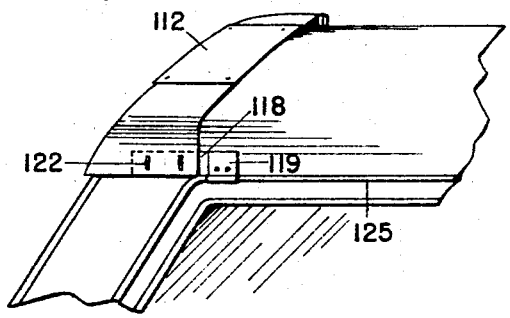
FIG. 4 is a partial isometric view of another embodiment of the shield supported on the rear end of a station wagon.
Figure 5:
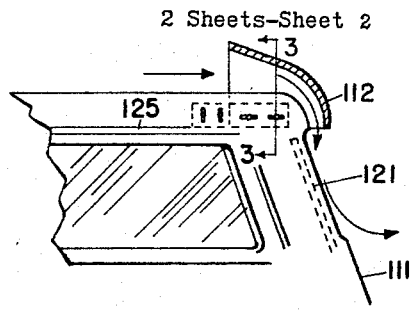
FIG. 5 is a side view partly in cross section of the shield and wagon shown in FIG. 4.
Figure 6:
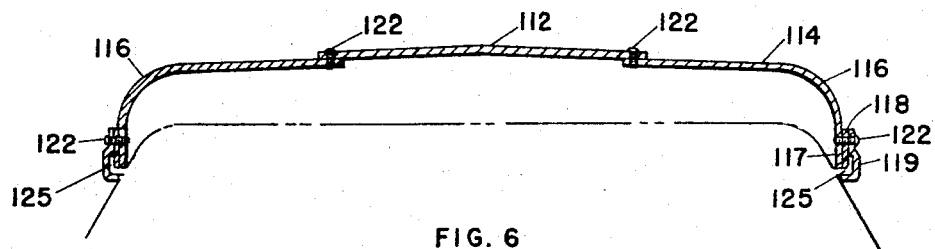
FIG. 6 is a cross sectional view similar to FIG. 3 of the second embodiment.
Figure 7:
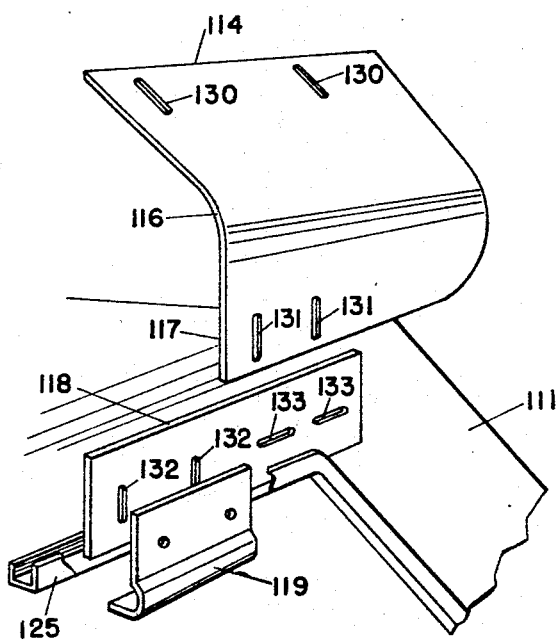
FIG. 7 is an exploded view of the device shown in FIG. 6.

Other embodiments are shown in FIGS. 4, 5, 6, and 7. In FIG. 4 the sheet like shield 112 is curved over the rear edge of the vehicle top and has L-curved end sections 116 which are attached by means of screws 122 to the plate like brackets 118. The plate like brackets 118 are in turn attached by means of the screws 122 to the L-shaped clamps 119. The brackets 118 rest inside the rain gutter along with the lower end of the curved end sections 116. The clamp 119 extends underneath the rain trough. Because of the slots 130, 131, 132, and 133, the device can be adjusted to fit various vehicles of different widths and of different configurations.

It will be noted in FIG. 4 that the clamp 119 is disposed in front of the downwardly extending leg of the rain gutter 125 so that the device cannot slide rearwardly.

It will further be noted that the rear end of the shield 112 extends downwardly over the end of the vehicle at 112 and directs the air downwardly over the rear window thereof.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a shield for a vehicle and a vehicle having a rain gutter along each side comprising a cover sheet,
    said cover sheet adapted to overlie the rear end of the top of a vehicle and curving downwardly therefrom,
    a curved side section attached to each side of said sheet,
    said side section curving downwardly at its sides and resting in a part of said rain gutter along each side of said vehicle,
    and clamping means including a bracket member for securing said cover sheet to said rain gutter and having means thereon to clamp to said side sections of said cover sheet whereby said cover sheet is held in position on said vehicle.
2. The combination recited in claim 1 wherein
    said clamping means comprises a clamp attached to said bracket member and adapted to underlie said rain gutter.

3. The combination recited in claim 1 wherein said clamping means has an L-shaped member adapted to be received around and under the rain gutter of said vehicle,
said L-shaped member having means on the upper end thereof for attaching it to said bracket member.

4. The shield recited in claim 3 wherein said bracket is attached to said shield by means of bolts extending into slots in said bracket member and in said shield whereby said shield can be adjusted relative to said bracket.

5. The combination recited in claim 3 wherein said L-shaped member comprises an L-shaped bracket having one leg thereof underlying said rain gutter and the other leg extending generally parallel to said lower end of said curved end section,
and means attaching said L-shaped bracket to said lower end of said curved end section.

6. The shield recited in claim 5 wherein a bracket member is disposed between said L-shaped bracket and said lower end and comprises means for attaching said L-shaped bracket to said lower end.

7. The shield recited in claim 5 wherein bolt means connecting said curved end section to said sheet comprises slots in said end section receiving bolts therein,
said bolts extending through said end section and said sheet.

References Cited by the Examiner

UNITED STATES PATENTS

| | | | |
|---|---|---|---|
| 1,584,275 | 5/1926 | Chalkley. | |
| 2,599,809 | 6/1952 | Branch | 296—95 |
| 2,628,123 | 2/1953 | Lyon | 296—95 |
| 2,628,124 | 2/1953 | Dieterich | 296—95 |
| 2,673,117 | 3/1954 | Krusemark | 296—95 |
| 2,919,952 | 1/1960 | Riddle et al. | 296—91 |
| 3,000,663 | 9/1961 | Lucchesi | 296—91 X |
| 3,095,034 | 6/1963 | Francis | 296—95 X |

BENJAMIN HERSH, *Primary Examiner.*

J. A. PEKAR, *Assistant Examiner.*